United States Patent [19]

Wagstaff

[11] Patent Number: 4,698,955
[45] Date of Patent: Oct. 13, 1987

[54] BALE DENSITY CONTROL SYSTEM FOR ROUND BALERS

[76] Inventor: Robert A. Wagstaff, 2590 Ponderosa Dr., Lancaster, Pa. 17601

[21] Appl. No.: 830,030

[22] Filed: Feb. 18, 1986

[51] Int. Cl.⁴ ............................................. A01D 39/00
[52] U.S. Cl. .......................................... 56/341; 100/88
[58] Field of Search ....................... 56/341; 100/88, 89, 100/50

[56] References Cited

U.S. PATENT DOCUMENTS

| | | | |
|---|---|---|---|
| 3,722,197 | 3/1973 | Vermeer | 56/341 |
| 3,763,636 | 10/1973 | Bliss | 56/341 X |
| 4,257,219 | 3/1981 | Burrough et al. | 56/341 |
| 4,611,535 | 9/1986 | Anstey et al. | 56/341 X |
| 4,627,340 | 12/1986 | Glass et al. | 100/89 X |

*Primary Examiner*—Stephen J. Novosad
*Assistant Examiner*—Matthew Smith
*Attorney, Agent, or Firm*—Darrell F. Marquette; Frank A. Seemar; Larry W. Miller

[57] ABSTRACT

A system for controlling the density of bales formed in a round baler includes a hydraulic cylinder unit of the single acting type connected between the frame of the round baler and a pair of arms which are pivotally mounted on the baler frame. These arms carry a set of conveying members or rollers and are movable between a bale starting position and a full bale position. The bale density control system includes a control valve that is adjustable in order to permit fluid flow from the hydraulic cylinder unit to a reservoir when the fluid pressure in the hydraulic cylinder unit reaches a preselected level. When the arms move from their bale starting position to their full bale position, the hydraulic cylinder unit is contracted and fluid flows from the hydraulic cylinder unit to the reservoir via the control valve when the preselected level of fluid pressure is reached. Conversely, when the arms move from their full bale position to their bale starting position, the hydraulic cylinder unit is extended and fluid flows from the reservoir to the hydraulic cylinder unit via a one way check valve.

6 Claims, 2 Drawing Figures

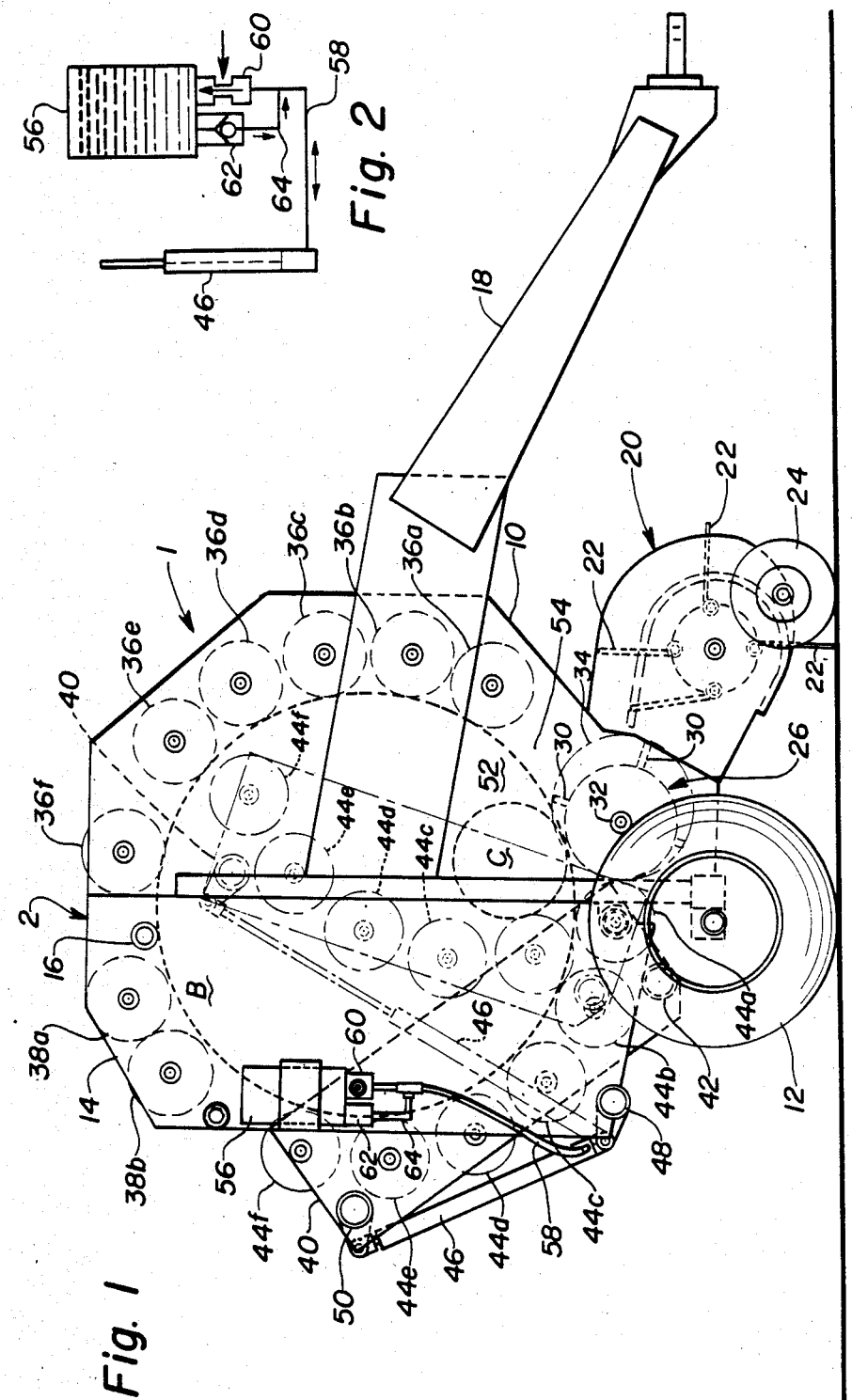

BALE DENSITY CONTROL SYSTEM FOR ROUND BALERS

BACKGROUND AND SUMMARY OF THE INVENTION

This invention relates generally to roll baling machines typically referred to as round balers which form cylindrical roll bales of crop material and, in particular, to a bal density control system for such roll baling machines.

Hydraulic systems have been used on round balers in the past to control bale density. For example, U.S. Pat. No. 3,722,197 discloses such a hydraulic system for round balers in which double acting cylinder assemblies are utilized for controlling movement of a belt tensioning unit in order to control the density of the formed bales. A drawback of the hydraulic system disclosed in U.S. Pat. No. 3,722,197 is that it is too complex and too expensive when compared with conventional tension springs which have also been used on round balers for effectively controlling bale density.

The present invention provides a system for controlling bale density in a round baler having a frame with arm means mounted on the frame carrying conveying means for forming crop material into roll bales. The arm means is movable between a bale starting position and a full bale position.

The system of the present invention includes a single acting hydraulic cylinder unit connected between the frame and the arm means, a reservoir in fluid communication with the hydraulic cylinder unit, and a control valve for permitting fluid flow from the hydraulic cylinder unit to the reservoir only when the fluid pressure in the hydraulic cylinder unit reaches a preselected level. In the preferred embodiment of the system, the movement of the arm means from the full bale position to the bale starting position causes extension of the hydraulic cylinder unit which results in fluid flow from the reservoir into the hydraulic cylinder unit.

DESCRIPTION OF THE DRAWINGS

FIG. 1 is a side elevational view of a round baler incorporating the bale density control system of the present invention; and FIG. 2 is a schematic view of the bale density control system of the present invention.

DESCRIPTION OF THE INVENTION

Referring to FIG. 1, a round baler 1 includes a frame 2 consisting of a base frame portion 10 supported by a pair of wheels 12 and an auxiliary frame portion or tailgate 14 pivotally connected to the base frame portion 10 by stub shafts 16 mounted in suitable bearings. A tongue 18 is provided on the forward end of the base frame portion 10 for connection to a towing vehicle such as a tractor (not shown). A pickup 20 is attached to the base frame portion 10 and includes a series of fingers 22 movable in a path to lift crop material from the ground. The pickup 20 is supported by a wheel 24. A feeder drum 26 is rotatably mounted on the base frame portion 10 and includes a cylinder 28 and a plurality of fingers 30 mounted on a shaft (not shown) that is offset relative to the shaft 32 on which the cylinder 28 is mounted. As the cylinder 28 is rotated on the shaft 32, the fingers 30 reciprocate through openings in the cylinder 28 so that the tips of the fingers 30 follow a path designated 34.

The round baler 1 includes a set of conveying members or rollers 36a through 36f fixedly journalled in bearings mounted in the sidewalls 11a,11b of the base frame portion 10. Another set of conveying members or rollers 38a and 38b is fixedly journalled in bearings mounted in sidewalls 15 of the tailgate 14. A pair of arms 40 are pivoted at one end on stub shafts 42 mounted in the tailgate 14. A further set of conveying members or rollers 44a through 44f is rotatably carried by the arms 40. A hydraulic cylinder unit 46 is pivoted at its lower end to a beam 48 extending between the sidewalls 15 of the tailgate 14 and at its upper end to a beam 50 connected between the arms 40. The sets of rollers 36a-36f, 38a-38b and 44a-44f constitute mechanism for forming crop material into roll bales. Other aspects of the round baler 1 such as the drive system therefor will be understood from commonly assigned U.S. Pat. No. 4,566,379 issued Jan. 28, 1986, and incorporated herein by reference.

When the round baler 1 is empty, the arms 40 are in a bale starting position shown in phantom in FIG. 1 so that the rollers 44a through 44f carried thereon cooperate with the feeder drum 26 and with the rollers 36a through 36d to define a bale starting chamber 52 which is elongated in a generally vertical direction. The roller 36a is spaced from the feeder drum 26 a sufficient distance to provide an inlet 54 to the bale starting chamber 52. The pickup 20 and the feeder drum 26 deliver crop material into the bale starting chamber 52 through the inlet 54 to form the core C of a roll bale. As the core C increases in diameter, the arms 40 are moved toward a full bale postion shown in full lines in FIG. 1. When a full bale B has been formed, the tailgate 14 is pivoted upwardly on the stub shafts 16 and bale B is discharged. Subsequently, the tailgate 14 is returned to the closed position of FIG. 1 and the arms 40 return to the their bale starting position so that the baler 1 is ready to form another bale.

The bale density control system according to the present invention includes the hydraulic cylinder unit 46 which is of the single acting type and a reservoir 56 containing hydraulic fluid. The cylinder unit 46 is connected through a conduit 58 and a control valve 60 to the reservoir 56. The control valve 60 is preferably adjustable in order to permit fluid passage from the cylinder unit 46 to the reservoir 56 only when the hydraulic fluid pressure in the cylinder unit 46 reaches a preselected level. The reservoir 56 is also connected through a check valve 62, a conduit 64 and the conduit 58 to the cylinder unit 46. The check valve 62 is the one way type and, therefore, permits fluid passage from the reservoir 56 through the conduits 64 and 58 into the cylinder unit 46 but prevents fluid passage through the conduit 64 into the reservoir 56.

It will be understood that when the round baler 1 is empty and when the arms 40 are in their bale starting position shown in phantom in FIG. 1, the cylinder unit 46 is fully extended which causes hydraulic fluid to be drawn out of the reservoir 56 through the check valve 62 and the conduits 64 and 58 into the cylinder unit 46. This charges the cylinder unit 46 with hydraulic fluid and holds the arms 40 in their bale starting position as crop material is fed into the bale starting chamber 52 to from the core C of a roll bale. As the core C increases in diameter, the arms 40 move toward their full bale position shown in full line in FIG. 1 and thereby increase the fluid pressure in the cylinder unit 46 by contracting it. This causes the roll bale to be compacted to a desired density. When the fluid pressure in the cylinder unit 46 reaches a preselected level, the control valve 60 opens to allow fluid passage from the cylinder unit 46 through the conduit 58 into the reservoir 56. The density of the roll bale is thereby controlled during its formation by a substantially uniform compressive force. When a full bale B has been completed, the tailgate 14 is raised to discharge the bale B, and then the arms 40 return to their bale starting position, due to gravity, as the tailgate 14 is subsequently lowered. This movement of the arms 40 from their full bale position to their bale starting position causes extension of the cylinder unit 46 which creates a vacuum in the cylinder unit 46 and thereby results in the flow of hydraulic fluid from the reservoir 56 into the cylinder unit 46 via the check valve 62 and the conduits 64, 58.

The control valve 60 may be Model No. 0-532-003-001 manufactured by Robert Bosch Corporation. This particular valve is infinitely adjustable over a range of 214.5 psi to 2145 psi.

Another important feature of the bale density control system of the present invention is that it is self-contained and thus does not require connection to a remote system such as a tractor hydraulic system.

It will be understood that the bale density control system of the present invention may also be used on a round baler where conveyor belts instead of rollers constitute the conveying members of the bale forming mechanism. This general type of round baler is disclosed in U.S. Pat. No. 4,119,026. Consequently, in the round baler 1 shown herein in FIG. 1, each of the sets of rollers 36a–36f, 38a–38b and 44a–44f may be replaced by one or more conveyor belts.

The following claims are intended to cover all modifications and variations of the preferred embodiments of the invention disclosed herein.

Having thus described the invention, what is claimed is:

1. In a round baler having a frame, arm means mounted on said frame carrying conveying means for forming crop material into roll bales, said arm means being movable between a bale starting position and a full bale position, a system for controlling the density of the roll bales formed in said round baler, said system comprising:
   a single acting hydraulic cylinder unit connected between said frame and said arm means for resisting movement of said arm means only when said arm means moves from said bale starting position toward said full bale position;
   a reservoir for containing hydraulic fluid, said reservoir being in fluid communication with said hydraulic cylinder unit;
   a control valve in fluid communication between said hydraulic cylinder unit and said reservoir for permitting fluid flow from said hydraulic cylinder unit to said reservoir only when the fluid pressure in said hydraulic cylinder unit reaches a preselected level during contraction of said hydraulic cylinder unit.

2. The system of claim 1, further comprising a one way check valve in fluid communications between said hydraulic cylinder unit and said reservoir for permitting fluid flow from said reservoir to said hydraulic cylinder unit during extension of said hydraulic cylinder unit.

3. The system of claim 2, wherein the movement of said arm means from said full bale position to said bale starting position causes extension of said hydraulic cylinder unit which results in fluid flow from said reservoir into said hydraulic cylinder unit via said check valve.

4. The system of claim 3, wherein the movement of said arm means from said bale starting position to said full bale position causes contraction of said hydraulic cylinder unit which results in fluid flow from said hydraulic cylinder unit to said reservoir via said control valve when the fluid pressure in said hydraulic cylinder unit reaches said preselected level.

5. In a round baler having a frame, a first set of conveying members fixedly mounted on said frame, arm means movably mounted on said frame carrying a second set of conveying members which cooperates with said first set of conveying members to form crop material into roll bales, said arm means being movable between a bale starting position and a full bale position, a system for controlling the density of roll bales formed in said round baler, said system comprising:
   a single acting hydraulic cylinder unit connected between said frame and said arm means for resisting movement of said arm means only when said arm means moves from said bale starting position toward said full bale position;
   a reservoir for containing hydraulic fluid, said reservoir being in fluid communication with said hydraulic cylinder unit;
   a control valve in fluid communication between said hydraulic cylinder unit and said reservoir for permitting fluid flow from said hydraulic cylinder unit to said reservoir only when the fluid pressure in said hydraulic cylinder unit reaches a preselected level during contraction of said hydraulic cylinder unit;
   a one way check valve in fluid communication between said hydraulic cylinder unit and said reservoir for permitting fluid flow from said reservoir to said hydraulic cylinder unit during extension of said hydraulic cylinder unit;
   said hydraulic cylinder unit being extended by the movement of said arm means from said full bale position to said bale starting position hereby causing fluid flow from said reservoir into said hydraulic cylinder unit via said check valve; and
   said hydraulic cylinder unit being contracted by the movement of said arm means from said bale starting position to said full bale position thereby causing fluid flow from said hydraulic cylinder unit into said reservoir via said control valve when the fluid pressure in said hydraulic cylinder unit reaches said preselected level.

6. The round baler of claim 5, wherein the conveying members of said first and second sets of conveying members comprise rollers.

* * * * *